United States Patent [19]

Oswald

[11] 3,754,238

[45] Aug. 21, 1973

[54] METHOD AND DEVICE FOR TRANSMITTING BIVALENT SIGNALS

[76] Inventor: Jacques Oswald, 1 rue Salomon de Brosse, 78 Versailles, France

[22] Filed: Apr. 2, 1970

[21] Appl. No.: 25,120

[30] Foreign Application Priority Data

Apr. 2, 1969 France .............................. 6910102

[52] U.S. Cl. ... 340/347 DD, 178/DIG. 3, 235/92 R, 235/92 CV, 235/92 T

[51] Int. Cl. .... H03k 13/00, H03k 13/24, H041 3/00

[58] Field of Search ............. 340/347 AD, 347 DD, 340/204, 206, 353; 332/9; 328/48, 50, 108, 109, 110, 111, 129, 130, 135; 307/232; 329/107; 179/15 AB; 325/143, 325, 38; 235/92 T, 92 TF; 178/DIG. 3

[56] References Cited

UNITED STATES PATENTS

| | | | |
|---|---|---|---|
| 3,221,159 | 11/1965 | Cook et al. | 340/347 R X |
| 3,299,204 | 1/1967 | Cherry et al. | 179/15 BA |
| 3,566,090 | 2/1971 | Johnson | 235/92 DM |
| 2,978,535 | 4/1961 | Brown | 178/6 DIG. 3 |
| 3,210,756 | 10/1965 | Flood | 340/347 DD |
| 3,510,632 | 5/1970 | Strandberg | 235/92 TF |
| 3,538,247 | 11/1970 | Quinlan et al. | 178/6 DIG. 3 |

OTHER PUBLICATIONS

Millman & Taub, "Pulse & Digital Circuits," McGraw-Hill, 1956, p. 411.

Susskind, "Notes on A-D Conversion Techniques," 1959, pages 3-11 to 3-17.

*Primary Examiner*—Maynard R. Wilbur
*Assistant Examiner*—Thomas J. Sloyan
*Attorney*—Craig, Antonelli & Hill

[57] ABSTRACT

The invention is concerned with a coding of telegraphic transistions based on the marking of the instant of a transition within the framework of a division of the definite sequence of the signals into sections having a fixed length shorter than the shortest possible duration of a stage without transition. These sections are subdivided into intervals; the order number of an interval where a transition has taken place is transmitted into reflected binary code, which assures a certain number of advantages.

16 Claims, 7 Drawing Figures

FIG. 4

| Value | Coded Value |
|---|---|
| 0 | 000000 |
| 1 | 000001 |
| 2 | 000011 |
| 3 | 000010 |
| 4 | 000110 |
| 5 | 000111 |
| 6 | 000101 |
| 7 | 000100 |
| 8 | 001100 |
| 9 | 001101 |
| 10 | 001111 |
| 11 | 001110 |
| 12 | 001010 |
| 13 | 001011 |
| 14 | 001001 |
| 15 | 001000 |
| 16 | 011000 |
| 17 | 011001 |
| 18 | 011011 |
| 19 | 011010 |
| 20 | 011110 |
| 21 | 011111 |
| 22 | 011101 |
| 23 | 011100 |
| 24 | 010100 |
| 25 | 010101 |
| 26 | 010111 |
| 27 | 010110 |
| 28 | 010010 |
| 29 | 010011 |
| 30 | 010001 |
| 31 | 010000 |

| Value | Coded Value |
|---|---|
| 32 | 110000 |
| 33 | 110001 |
| 34 | 110011 |
| 35 | 110010 |
| 36 | 110110 |
| 37 | 110111 |
| 38 | 110101 |
| 39 | 110100 |
| 40 | 111100 |
| 41 | 111101 |
| 42 | 111111 |
| 43 | 111110 |
| 44 | 111010 |
| 45 | 111011 |
| 46 | 111001 |
| 47 | 111000 |
| 48 | 101000 |
| 49 | 101001 |
| 50 | 101011 |
| 51 | 101010 |
| 52 | 101110 |
| 53 | 101111 |
| 54 | 101101 |
| 55 | 101100 |
| 56 | 100100 |
| 57 | 100101 |
| 58 | 100111 |
| 59 | 100110 |
| 60 | 100010 |
| 61 | 100011 |
| (+)62 | 100001 |
| (−)63 | 100000 |

METHOD AND DEVICE FOR TRANSMITTING BIVALENT SIGNALS

The present invention relates to a method for transmitting two-level signals, for example, the type of signals employed in telegraphy or in the transmission of information by coded pulses. The present invention also relates to particular wiring connections being used for transmitting and for receiving the signals according to this method.

Known under the name of modulation by coded pulses MIC, i.e., pulse-coded modulation, (PCM), is a method of modulation consisting of taking at regular intervals, samples of the low-frequency signal to be transmitted and in quantizing these samples with respect to a grid or matrix having a level practically always on a binary base, or $2^n$ level. This gives rise to a train of n pulses, each of which, having a position identified as $i$, has a weight $2^i$ corresponding to the position thereof. The MIC or PCM method is, thus, essentially a method of numerical coding of instantaneous quantized levels and of transmitting the code in the form of pulses, most often in the form of a train of series pulses, with means for separating the successive trains, coding the successive samples of the level and for identifying thereby the equilibrium or balance of each pulse of one train by its position in the train.

In the systems of telegraphy and transmission of numerical data, the signals are generally in the form of two-level waves whose polarity changes periodically at the frequency of the modulation. The information to be transmitted is, therefore, present in the form of marks having a logical value 1, of variable duration, uncertain distribution and separated by stages having a logical value 0. The beginning of one mark constitutes a transition from zero to one or minus to plus. The end of one mark constitutes a transition from one to zero or plus to minus. The transmission of such data in numerical form follows the time of each transition and the direction thereof.

In the majority of cases, the duration of the various signals having a given level or state (0 or 1, or either negative or positive) is a multiple of an interval of time or "moment" of duration T. The transmitting systems convey these signals either in original form or in the form of modulation of a carrier wave. In synchronous operation, the transitions are produced at all times at instants separated by multiple intervals of T; on the other hand, in an asynchronous or arythmic system, there is no absolute mark or basis of reference for the time period of the transitions. The principal advantage of the synchronous systems consists in admitting by virtue the use of signal regenerators, very important margins of distortion reaching almost 100 percent. On the other hand, they are very rigid and can function only at a given rate, which can be inconvenient in many applications. The arythmic or asynchronous systems are, instead, much more flexible and oftentimes it is possible to have the systems operate at different rates without a modification of the equipment. They correspond equally to the cases of use very frequently encountered. But on the other hand, the distortions caused by the transmission channel cannot be integrally compensated and the operating margins are much more reduced. In a general manner, the "transparence" of the systems; i.e., the ability thereof to restore the telegraphic transitions to their position, whatever that position may be, ensures continuous possibility of variation of the position of these transitions. From this point of view, the transparent systems have an "analogic" character in spite of the quantization of the amplitude thereof.

The technique proposed by the present invention allows for overcoming the disadvantages of the two systems outlined above. This technique assures a quasi total "transparence" and may be employed in the case of any arythmic or asynchronous sequence whatsoever. On the other hand, the distortions of the signals remain, with a margin of operation close to 100 percent, smaller than a previously determined value and as small as is desired. Moreover, the telegraphic distortions are not cumulative, no matter how many systems are arranged in tandem.

SUMMARY OF THE INVENTION

According to the present invention, a technique for coding a two level signal of the type used in telegraphic and assimilated signals having the form of marks in the form of zeroes and ones or pluses and minuses and being of variable duration, separated by transitions, the shortest possible duration between transitions being at least equal to a specific duration T, comprises a division of the time into equal intervals or sections having a fixed duration Θ smaller than the aforementioned shortest possible duration T. Further, each of these intervals is subdivided into an integral number n of subintervals being equal with respect to each other which receive a number according to their position in the interval and the incident signal is sampled by short pulses delimiting these subintervals. The indexing of a transition possibly occurring within an interval between two samplings is made on the basis of the number of the position of the corresponding subinterval. Since the duration of one portion Θ is shorter than the duration T of the shortest possible mark, the result is that in one section or portion there is never more than one transition; i.e., there is either 0 or 1.

According to another characteristic of the present invention, in the case where one interval possesses a permanent level or state without transition, the coding comprises an indexing characterizing this state or level, or a total of two fixed indexings for the two possible levels or states.

According to a further characteristic of the present invention, the numerical value of one indexing is furnished in the form of succession of balanced and uniformly distributed pulses during the interval following the indexing at a slower frequency than the samplings.

According to a still further characteristic of the present invention, the code used for the indexing is the reflected binary code, with $k$ binary digits, and the sampling pulses delimiting the aforementioned subintervals are numbered from 2 to $2^k-3$, the combination $2^k-2$ serving for indexing a permanent level during a past interval, and the combination $2^k-1$ serving for indexing the other permanent level, whereas the combinations 0 and 1 are not utilized for the indexing.

Finally, according to another characteristic of the present invention, the synchronization of the code is assured by the identification of the combination of the code having the highest numerical value ($2^k-1$) which is the only one to comprise a binary digit of the value 1 followed by $k-1$ binary digits having the value 0.

The foregoing description shows the advantages of the principle proposed by the present invention. In fact, the information is entirely coded so that the identification of the elements of the code is necessary, but equally sufficient, for determining the position of the transition with a previously assigned precision. With six code pulses, the distortion does not exceed ± 1.5 percent, whatever may be the deformations of the signals of the code themselves (as long as they remain indentifiable). Until the discrimination threshold is attained, the performances do not depend upon the signal/noise ratio. One can transfer the code by several transmission paths in tandem without supplementary degradation. The "margin" is close to 100 percent because the distortion remains constant as long as the code is identifiable and conveniently assigned to the interval to which it is allotted. It is seen furthermore that the system is completely transparent and can operate at any telegraphic frequency smaller than that which corresponds to the duration of the interval.

This system is the transposition for the numeric or telegraphic signals of the pulse-coded systems of the telephonic signal in MIC or PCM. As a matter of fact, it is no longer the amplitude which is coded, but the position within the period of the telegraphic transition. One thus finds the same advantages as those well known in MIC or PCM systems. But, as in the case of the latter, the advantages acquired result in an increase of the necessary band width. In the case dealt with above, one substitutes six code pulses for an interval slightly shorter than the moment of "telegraphic" transmission. One thus multiplies, roughly, the band width by six. The numerical example which has been treated here shows that the frequency of recurrence of the code pulses is 10 kHz for the coding of a sequence whose rapidity is 1,500 Bauds.

BRIEF DESCRIPTION OF THE DRAWINGS

The present invention will now be further described hereinafter on the basis of and with reference to the accompanying drawings, wherein

FIG. 4 is a table of the reflected binary code, or GRAY code, used in the invention;

DETAILED DESCRIPTION

Figure 1:
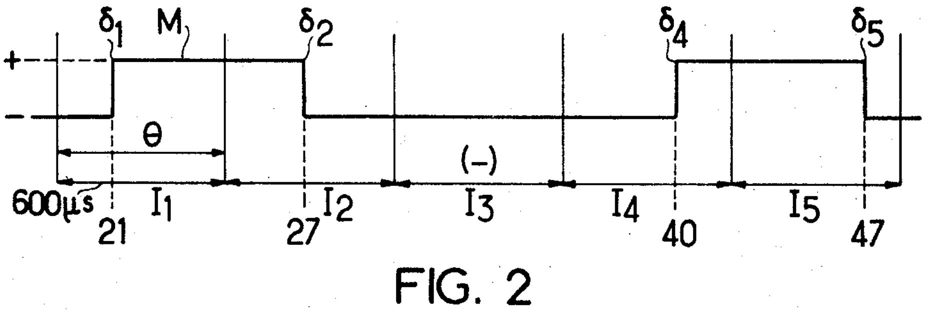
FIG. 1 illustrates a sequence of signals divided into sections having one interval as their duration.

FIG. 1 represents a sequence of arbitrary two-level signals, such as a telegraphic transmission or any transmission of numerical data. The only presumption which is made is that any signal of a given level or polarity (positive or negative) has a duration longer than or equal to a known duration T.

The sequence of signals M to be transmitted is subdivided into equal elementary intervals having a unitary duration $\Theta < T$, succeeding each other indefinitely, the origin of the times being absolutely whatever may be desired, which is to say that the beginning of each interval is without correlation with the transitions of the signal. In FIG. 1, the intervals represented are numbered $I_1$, $I_2$, $I_3$, $I_4$, $I_5$. It should be understood that it is here a question of an extract from a sequence which can be extended on both sides. By way of example it has been assumed that this is a telegraphic transmission at a speed of manipulation of 1,500 bauds. In other words, the telegraphic moment has a duration of 666 $\mu s$, the duration T mentioned above. Under these conditions, and still by way of a non-limitative example one chooses for the duration $\Theta$ of one section 600 $\mu$sec.

The considerations for the choice of $\Theta$ for a given T will be expounded hereunder.

There is a transition ( − to + ) $\delta_1$ in the section $I_1$, a transition ( + to − ) $\delta_2$ in section $I_2$ ; no transition in section $I_3$, a transition ( − to + ) $\delta_4$ ; in section $I_4$ a transition ( + to − ) $\delta_5$ in section $I_5$.

Beneath each transition a number has been shown: 21 opposite $\delta_1$ ; 27 opposite $\delta_2$ ; 40 opposite $\delta_4$ ; 47 opposite $\delta_5$. Opposite $I_3$, being without transition, there is shown $a-$, which is effectively the permanent level of the section $I_3$.

The number appearing opposite one transition is the position of the pulse taken, serving for sampling the signal M which immediately follows this transition. This definition will be further explained hereunder with reference to FIG. 2.

Figure 2:
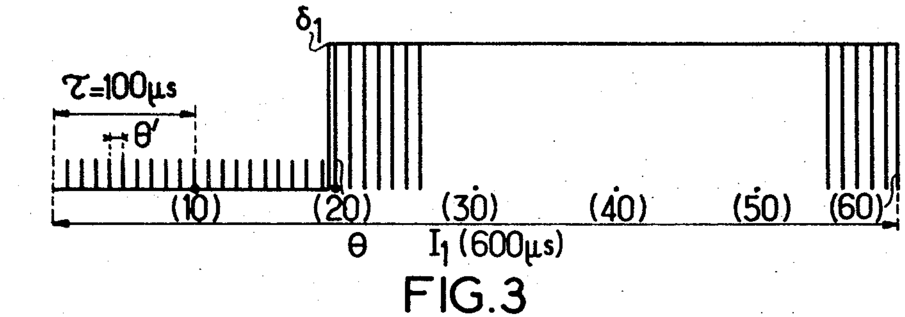
FIG. 2 shows a portion of FIG. 1 in an enlarged scale with the identification of one transition within a subinterval.

Shown in FIG. 2 at a larger scale is the section $I_1$ of FIG. 1.

This section is subdivided into 60 subintervals $\Theta'$, having a unitary duration of 10 $\mu s$. These intervals with the duration $\Theta'$ are delimited by short sampling pulses marked in FIG. 2 by fine vertical strokes. By a short pulse is meant a pulse being much shorter than the interval $\Theta'$, for example having a duration between 0.5 and 0.8 $\mu$s. The first pulses corresponding to the level or polarity (−) are low or reduced in amplitude. The others, corresponding to the valence mark ( + ) are high. Shown at one point in FIG. 2 are the pulses arriving at the times 10 $\Theta'$, 20 $\Theta'$, 30 $\Theta'$, 40 $\Theta'$, 50 $\Theta'$, 60 $\Theta'$. These numeric values are not generally the numbers of the order of the pulses, ( there is a shift by one unit ). One will see why this is so by referring to FIG. 3.

The transition $\gamma_1$ occurs between the 19th pulse and the 20th pulse. It is placed in evidence by the inversion of polarity of the sample taken by the 20th pulse as compared to the polarity of the sample taken by the 19th pulse. The 20th pulse bears the order number 21.

The transition $\gamma_1$ is indexed 21; this is the transmission of the numerical value 21 by series pulses coded in binary form which constitutes the transmission of the moment of the transition. As far as the direction is concerned, it is evidently known if the previous polarity is known. It will be noted that the technique is protected against false polarities by a significant safety factor.

Since the number of distinct numerical values to be indexed and transmitted is between 32 and 64, it is here a question of a coding at six binary digits with a maximal capacity of 63.

Figure 3:
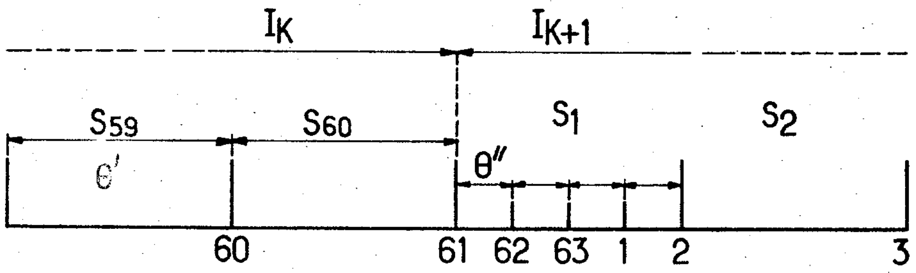
FIG. 3 illustrates in a further enlarged scale, the passage of one interval to the next following interval and the corresponding counting operations.

The six binary digits representing an indexing value are fed in line in the course of one interval in the form of pulses being balanced according to their position; for a complete message, pulses form a uniform spacing unit $\tau = \Theta/6 = 100\ \mu s.$ FIG. 3 shows at an even larger scale the zone of passage between a section $I_k$ and the next following section $I_{k+1}$. The last pulse taken from the section $I_k$ is marked 61; the next-to-the last, of an earlier instant of 10 $\mu$s is s 60, the preceding one 59, and so forth. The first pulse taken from the section $I_{k+1}$ bears the number 2, the next one number 3, and so forth.

The penultimate subinterval of the section $I_k$ has been designated with $S_{59}$, the last one with $S_{60}$, the first subinterval of the section $I_{k+1}$ is identified as $S_1$, the second one as $S_2$, etc.

The first subinterval $S_1$ is subdivided into four segments having a unitary duration $\Theta''$ equal to 2.5 $\mu$s by pulses at the positions 62, 63, 1, 2. The positions 62, 63 are indicated by auxiliary pulses, the state 2 is indicated by a normal sample pulse. The state 0 is not formed (see FIG. 6 below).

If a transition has occurred in the course of the interval $I_k$, one transfers the combination of the code characterizing the transition. If no transition has appeared within the interval $I_k$, no code has been transferred when the pulse No. 61 arrives. In this case according to the polarity of the signal, one transfers either the combination 62 (positive valence or state), or the combination 63 (negative valence or state). The values 62 and 63 are transferable. The values 0 and 1, on the other hand, are not transferrable. The first transferrable value after 63 is 2 (first value of the section $I_{k+1}$). The reason therefor will be explained in connection with FIG. 4.

FIG. 4 is a table of the numerical values from 0 to 63 coded in reflected binary code, also called Gray code.

In connection with the description of one example of a device for carrying out the method proposed by the present invention it will be noted that the coding of the position range or of one transition is carried out with the aid of a counter which counts the sample pulses, which is returned to zero at the beginning of each interval and the content of which is cleared and transferred when a transition appears. For the reasons which will be further explained below, one will substitute for the natural binary code, furnished directly by the counter, the reflected binary code in which two numbers of an adjacent range row differ only by a single binary digit. In fact, the properties of this reflected binary code may be used to good advantage in order to indicate not only the positions of the transitions within one interval, but equally the polarity of the signal and the beginning of the sections (synchronization of the code element). These different data are indispensable in order that the receiver may correctly restore the signal having been coded by the encoder.

The table of FIG. 4 recalls the combinations of the reflected binary code in a numbering increasing from 0 to 63 (for the case which has been choses as example there are six binary digits, but the properties utilized are absolutely general and directly transposable, whatever the number of digits of the code).

According to the process of the present invention, the following rules serve for the use of the code:

a. From among the 64 available combinations, only 60 are used for designating the 60 subintervals, from $S_2$ to $S_{61}$; see FIG. 3 above. The transfer of one of these combinations indicates that there has been a change of polarity ( transition ) in the previous subinterval.

b. The combination 0 (000000) is not formed; the combination 1 (000001) is formed but not transferred. Accordingly, among the transferred combinations, only the combination 63 contains 5 successive zeros.

c. The combination 62 (100001) indicates an absence of transition in the previous interval with positive polarity, for example (permanently positive).

d. The combination 63 (100000) indicates an absence of transition in the previous interval with negative polarity (permanently negative).

Within an indefinite sequence of code combinations which succeed each other in regular fashion and without separation, the combination 63 ( "permanently negative" at least in the interval considered ) is identifiable without any ambiguity, which renders it possible to synchronize the code at the reception thereof, that is to say, to recognize the first digit of each group of six binary digits forming a code. In fact, except for the combination 63 it is impossible to find a sequence composed of one "1" followed by at least five zeros.

In order to prove this, the different cases possible will be described.

The first involves two successive transitions within two adjacent intervals. Since the duration of the interval is shorter, hypothetically, than the shortest interval which separates two successive transitions, the result is that the position of the transition in the interval $I_n + 1$ is of necessity greater than the position of the transition of the interval $I_n$; and it is clear according to the table that a succession of two digits of increasing orders or ranges cannot comprise or contain more than four zeros; as for example, 3–4, 3–5, 7–8, etc. In this first case it is thus impossible to encounter a sequence of "1" and of five zeros in a row. As a second case permanently a positive interval may be framed or enclosed by two combinations, as desired. One finds manifestly five zeros in a row following a "1" only for the combination 63 itself.

It is understood therefore that this allotment allows for determining the polarity of the signal in the absence of a transition and for confirming it each time one of the combinations 62 or 63 is emitted. Moreover, the synchronization of the code is assured and confirmed each time one encounters a negative polarity interval not containing a transition. This eventuality will be produced without delay even if the negative signals are all of a minimal duration, because the interval is shorter than any elementary signal and since there is no synchronization between the basis of time of sampling and the analyzed signal.

It is seen that the use of a Gray code combined with the process of the present invention affords remarkable facilities for the synchronization of the code received at the level of words, that is to say, the identification of $k$ positions of balanced pulses which index one transmission within an indefinite sequence of pulses. However, the process of the present invention is applicable to another code, but this involves a complication of the apparatus and a capacity loss in transmission.

Figure 5:
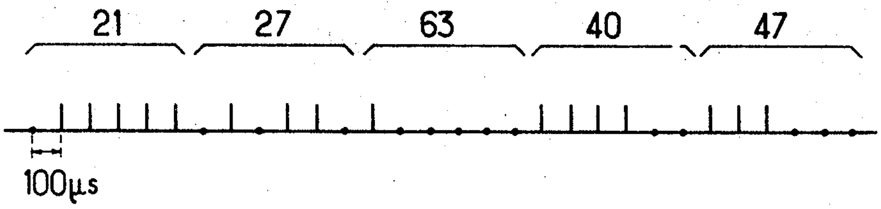
FIG. 5 shows the pulses coded for the indexing of the transitions of the signal of FIG. 1.

FIG. 5 represents, symbolically and at a regular spacing between the pulses coding different weights, the successive codes which are characteristic for the signal of FIG. 1. The pulses being effectively transmitted are marked with vertical strokes; the binary positions without pulses have been shown by points or dots.

The principle described hereinabove is general since the number of binary elements of the code does not intervene. If, for example, one is content with a code with four binary elements, one disallows the two combinations 0 ( 0000 ) and 1 ( 0001 ), and one reserves the combination 14 ( 1001 ) and 15 ( 1000 ) for the identification of the intervals without transition possessing a given polarity. The subdivision interval is then divided into twelve subintervals, which allows for limiting the systematic distortion to ± 8 percent approximately. The combination 15 is the only one to have three zeros following a "1" and the same method may thus be employed for the synchronization of the code.

DETERMINATION OF THE INTERVAL Θ .

The previous example relates to a case with weak distortion. For a nominal duration of the telegraphic moment of 666 μs, one admits that the real duration always remains clearly higher than 600 μs in all instances.

But in the general case it may happen that the intensity of the possible distortions is much higher and forces one to provide a smaller subdivison interval. It may therefore be wise to take as the sectioning interval an interval which is equal to half of the nominal period or even a little shorter than that.

But this is made at the expense of the band width, which is thus found to be extended.

As a matter of fact, in the previous example, the transmission of the information is made in the form of six binary positions in 600 μs or a band width, roughly speaking, in the order of 10 kHz. If one divides the duration of the interval by two for 30 subintervals per interval, one will have to transmit five binary positions per interval, or five pulses in 300 μs, or 10 pulses in 600 μs. The band width is thus multiplied by 10/6.

Figure 6:
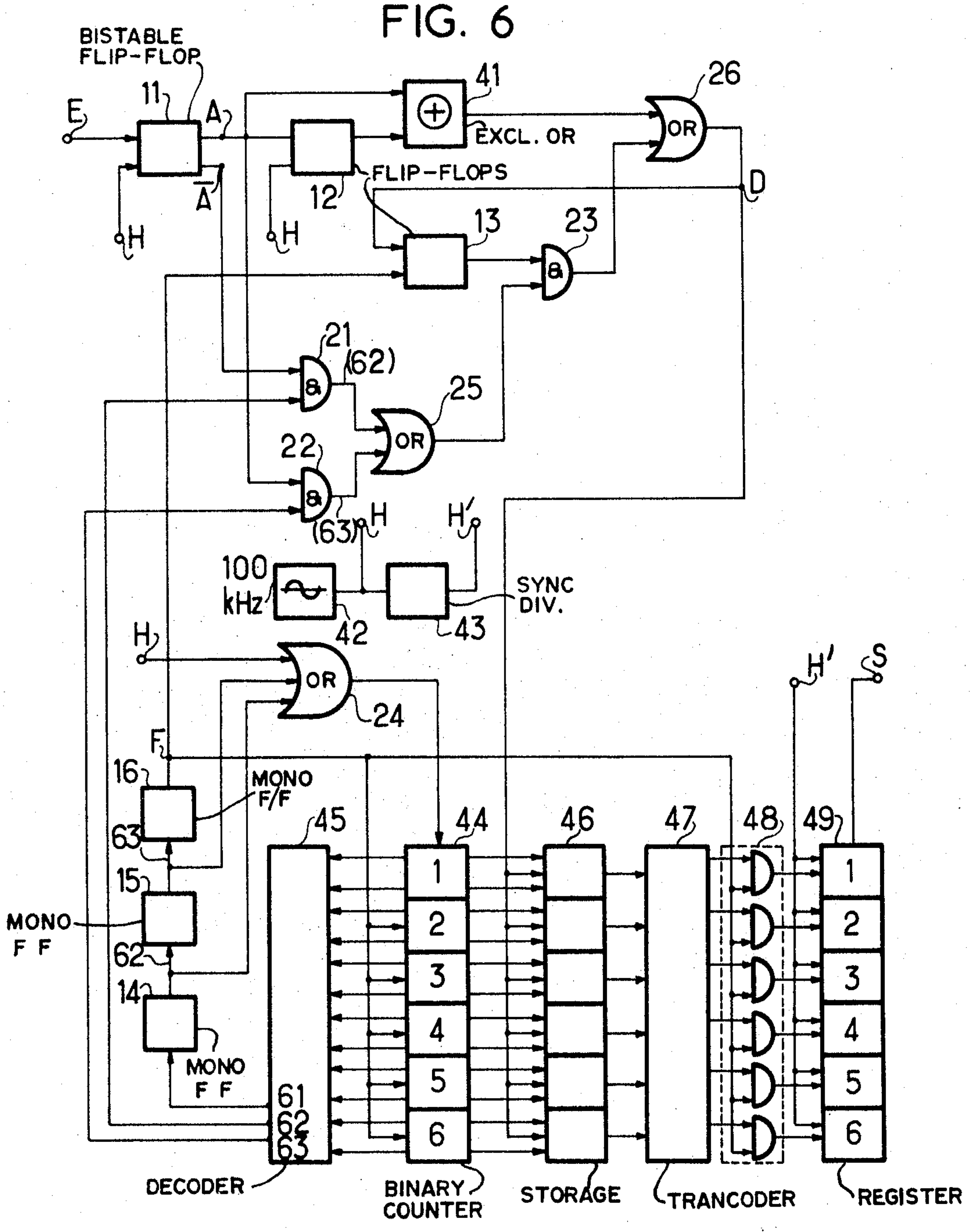
FIG. 6 is a diagram of one embodiment of a coder according to the present invention.

FIG. 6 is a logic diagram, given as an example of a coder furnishing a coding of the transitions according to the technique previously described.

11, 12 and 13 are bistable flip-flops.

14, 15 and 16 are monostable flip-flops; 14 and 15 give a delay of 2.5 μs, 16 gives a delay shorter than 6 μs .

21, 22, 23 are AND circuits with two inputs; while 24, 25, 26 are OR circuits.

41 is a "modulo 2" circuit, or an exclusive OR circuit.

42 is an oscillator furnishing at its output clock pulses H; in the case of the example, the frequency chosen for the H pulses is 100 kHz.

43 is an element for synchronizing on the H pulses a train of indefinite H' pulses having a lower frequency than the H pulses whose role will be explained below. In the present case, the element 43 is a simple divide-by-10 circuit.

44 is a binary counter with six binary digits; 45 is a decoder decoding the conditions 61, 62, 63 of the counter 44; 46 is a storage to which there is transferred the condition of the counter 44 under the command of a pulse appearing at D at the output of the AND circuit 26; 46 is a natural binary reflected binary transcoder receiving the content of the storage 46; the transcoded signals are transmitted to the output shift register 49 by AND circuit 48 under the command of a pulse appearing at F at the output of the monostable flip-flop 16.

The H' pulses are applied to the advance line of the shift register 49. The balanced pulses for indexing are received on the terminal S.

The operation of the circuit of FIG. 6 is as follows.

The counter 44 counts through the conditions 2 to 61 under the command of the H pulses spaced by 10 μs transmitted by 24. The condition 61 decoded by 45 causes a pulse to be generated which energizes the monostable flip-flop 14, which in turn, furnishes an output pulse delayed by Θ' =2.5 μs (see FIG. 3). This pulse is reinjected into the counter 44 by 24 and causes it to advance to 62.

The output pulse of 14 is again re-emitted by 15 with a delay of Θ' =2.5 μs; the output pulse of 15 is, in turn, re-injected by 24 into the counter which advances to 63.

The output pulse of 15 is re-emitted with a delay of 2.5 μs by 16; there issues at F a pulse for resetting the counter to 1. The condition 0 is never posted by the counter. It is for this reason that the position has been omitted from FIG. 3.

The signal M to be transmitted is applied at E to the input of the flip-flop 11 which is a recopying flip-flop and receives moreover the clock pulses H. The condition of the output A of 11 is applied to exclusive "OR" circuit 41, as is the output condition of the flip-flop 12, which receives on the one hand A and on the other hand the clock pulses H. The group 11, 12, 41 serves for comparing the polarities of two consecutive samplings of the signal M carried out at the frequency H.

If a change of polarity (transition) appears, an output pulse from 41 transmitted at D by 26 causes the condition of the corresponding counter to be entered into storage 46. The pulse D resets the flip-flop 13 to zero which therefore does not transmit anything by 23 through 26 and D in the case where a transition has appeared in the interval.

If there has been no transition in the interval when the condition 61 of the counter appears, the flip-flop 13 is set. The AND circuit 23 is thus conductive. One of the conditions 62 or 63 transmitted by 25 is thus transmitted at D. The state or condition 62 is transmitted by 21 for A = 1 (positive polarity); condition 63 is transmitted by 22 for $\bar{A}$ = 1 ( negative polarity ).

The pulse F resets the flip-flop 13 at the end of each interval. The balanced pulses are delivered in series by the output register 49 at a rate H' slower than the sample rate. In the PCM process it is the opposite: the balanced pulses are delivered at a faster rate than the samplings.

Figure 7:
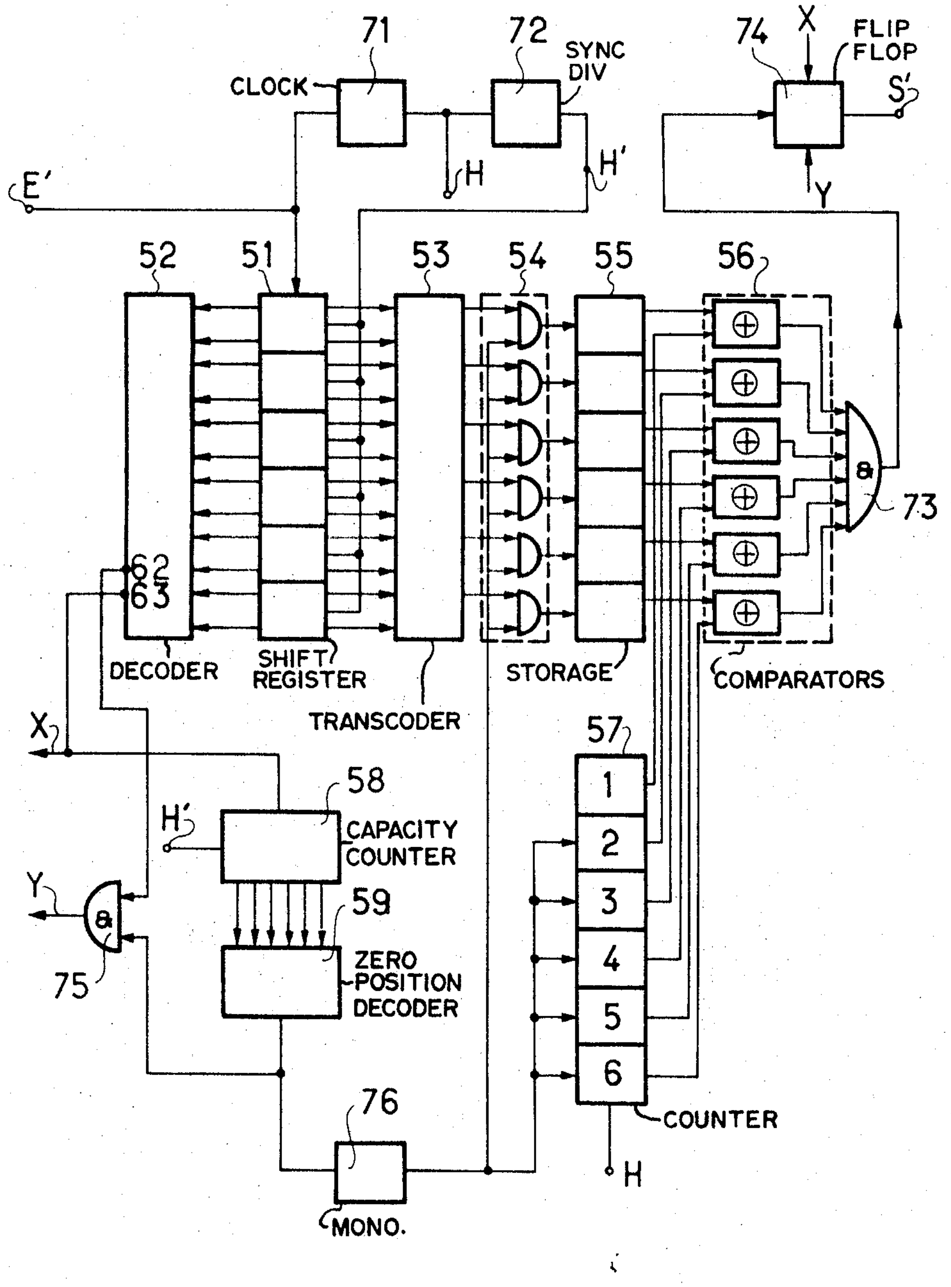
FIG. 7 is a diagram of an embodiment of an associated decoder.

FIG. 7 shows a diagram of a receiver decoding the signals received from an emitter of the type shown in FIG. 6.

The signals being coded in reflected binary code and arriving on a terminal E' are received in a shift register 51 which is associated with a decoder 52 having the conditions "62" or "63," and with a reflected binary code- natural binary code transcoder 53. The content of the transcoder 53 may be transferred into a storage 55 by a unit of six AND gates 54. A group or unit of six comparators 56 ("modulo 2" circuits or "exclusive OR" circuits) serves for comparing the characters in storage to the conditions of the flip-flops of a counter 57 having capacity 63, which receives at the input thereof the clock pulses H having the same frequency as the H pulses of the coder (FIG. 6), which are obtained as will be seen hereinbelow.

58 is a capacity counter 5 which is associated with a zero position decoder 59. The counter 58 receives H' pulses having the same frequency as the H' pulses of the coder (FIG. 6).

71 is a local clock synchronizing circuit which comprises a generator of clock pulses and means known per se for resetting these clock pulses (having a frequency of 100 kHz) from the incident pulses received at E'. From the member 71 there issue the H pulses mentioned above, which are counted by the counter 57. 72 is an element identical to the element 43 of the coder (FIG. 6) which delivers the H' pulses having a weaker rate than H; the H' pulses being received by the counter 58.

73 is an AND circuit having six inputs which transmit a controlling pulse to an output flip-flop 74 having an output terminal S' on which there is found again the signal transmitted upon the command of the six comparator circuits 56.

The output terminal "63" of the decoder 52 is connected to a " resetting to zero " input of the counter 58. It is also connected to a "resetting to 1" terminal X of the output flip-flop 74.

The output terminal "62" of the decoder 52 is connected to one input of an AND gate 75 whose other input receives a signal from the zero position decoder 59. The output of this AND gate is connected to a "resetting to zero" input Y of the flip-flop 74.

The output signal of the decoder 59 is also transmitted with a slight delay given by a monostable flip-flop 76— to the input of the six AND gates 54 and to the "resetting to zero" terminal of five of the stages of the counter 57 to six stages, thus effecting a resetting or return to 1 of the condition of the counter.

76 is a monostable flip-flop which has the purpose or function of delaying the transmission of the output signal of the decoder 59 for the time necessary for the propagation in the elements 53, 54.

The operation is as follows.

The clock 71 carries out the synchronization at the level of sampling. The counter 57 is a counter of the sampling time and the decoder 59 effects the synchronization at the level of the word of six characters.

At each through zero of the counter 58, the decoder 59 emits a signal which, delayed by 76, is applied for transfer to the AND gates 54 and in for resetting to the 1 condition of the counter 57.

The six code pulses stored in the register 51 are transcoded from reflected binary into natural binary code by the transcoder 53, and then transferred by the AND gates 54, at the beginning of the interval following the arrival of the complete combination of the code, to the storage register 55. The counter 57 which advances at the frequency of the H pulses counts through the 60 numbers from 2 to 61 and the comparator 56 verifies, binary digit by binary digit, to which number appertains the code in storage. The instant at which the counter reaches the combination according to the code in storage causes the condition of the output flip-flop 74 to change; hence the regeneration at the desired instant of the telegraphic transition.

When a permanently negative condition 63 will be present, a signal of resetting to 1 is applied directly to the flip-flop 74.

When a condition 62 (permanently positive) is present at the same time as a zero decoded by the decoder 59 (synchronism reached), a signal for resetting to zero is applied directly to the flip-flop 74 by the gate 75.

The conditions 62, 63 and 0 are never counted by the counter 57.

The installation could operate according to a code different from the reflected binary code, for example, in the natural binary code. But in this case the synchronization of the decoder would be much more laborious and costly in capacity of transmission. The use of the reflected binary code such as it is employed allows for using the invention to its best advantage.

Within the framework of the present invention, it is possible to transmit, over several telegraphic paths, having either the same telegraphic frequency or a different telegraphic frequency, by means of the same process of sub-dividing the time into intervals, which are counted according to a reflected binary system by using an apparatus of the type described above.

I claim:

1. A system including a coder portion and a decoder portion for respectively coding and decoding a bi-level incident signal having binary states of variable duration, the shortest time period between transitions from one binary state to another being a specified duration T, said coder portion comprising:

means for generating a series of clock pulses at a frequency H;

means, responsive to the receipt of said clock pulses, for sampling said incident signal at the frequency of said clock pulses;

means, responsive to said sampling means, for comparing the levels of two successive samples of said signal;

means, having $k$ binary stages, $k$ being a positive integer, for counting said clock pulses within a predetermined range in a recurrent manner, said counting starting at a position $n$, where $n$ is a positive integer, in the course of an interval $\Theta$ which is shorter than the shortest duration T during which the level of an incident signal remains constant, such that the pulses employed by said sampling means are spaced by a duration of approximately $\Theta/2^k$;

a memory having $k$ binary locations;

means, responsive to the absence of the occurrence of a level change in the course of said interval, for storing, in said memory, data representative of a prescribed count identifying said level as well as the absence of a change thereof; and a transfer means for transferring into said memory the contents of said counting means in response to the output of said comparing means produced upon the occurrence of different levels for two successive samples whereby the occurrence of a change in the level of two successive samples of said signal is indexed according to the position of said level change within the interval.

2. A system including a coder portion and a decoder portion according to claim 1, said coder portion further including means, responsive to said clock pulses, said clock pulses having a frequency H, for converting said clock pulses into a series of pulses which have a frequency H' and for shifting the contents from the $k$ locations of said memory in parallel form at a uniform spacing of $\pi = \Theta/k$ and converting said contents into a serial form signal in response to said series of pulses having a frequency H'.

3. A system including a coder portion and a decoder portion according to claim 1, said coder portion further including means for generating three successive pulses during a sub-portion of said intervals $\Theta$ between the last sampling pulse of the interval and the first sampling pulse of the next following interval; and means for introducing the first two of said three pulses into said counting means and for resetting said counting means in response to the third pulse of said three pulses.

4. A system including a coder portion and a decoder portion according to claim 2, said coder portion further including a means coupled between said memory and said shifting means for transcoding natural binary coded signals into reflected binary coded signals.

5. A system including a coder portion and a decoder portion according to claim 4, said coder portion further including means responsive to said transcoding means for transferring the contents of said memory which have been transcoded into reflected binary code into said converting means once per interval Θ, in response to the resetting of said counting means.

6. A system including a coder portion and a decoder portion according to claim 5, said coder portion further including a first decoder connected with said counting means and having three outputs, the first one of which is connected to the input of a three stage delay circuit, whose total delay is less than $\Theta/k$, the output of the third stage delivering a pulse for resetting said counting means.

7. A system including a coder portion and a decoder portion according to claim 6, wherein the first and second stages of said delay circuit are connected to said counter through a logic circuit which receives said clock pulses, whereby the first pulse in an interval causes the counting means to advance from a count of 1 to 2 and subsequent pulses cause said counter to advance from 2 to $1 + n = 2^k - 3$, while the pulses received from the first and second stages of said delay circuit causes said counting means to advance from $2^k - 3$ to $2^k - 2$ and $2^k - 2$ to $2^k - 1$, respectively.

8. A system including a coder portion and a decoder portion according to claim 7, said coder portion further including means responsive to a signal generated by one of said comparing means and the two outputs of said first decoder for supplying a transfer signal to said memory.

9. A system including a coder portion and a decoder portion according to claim 8, wherein said means for supplying a transfer signal includes an exclusive-OR circuit coupled with a logic circuit for preventing a transfer signal from being transmitted to said memory if said exclusive-OR circuit has emitted a transfer signal to said memory during said interval.

10. A system according to claim 2, including a coder portion and a decoder portion, said decoder portion having means for converting said serial form signal into a bi-level output signal comprising a shift register made up of $k$-stages for receiving said serial form signal, a receiver clock generating a series of clock signals connected to said shift register for controlling the shifting of said serial form signal into said shift register, a receiver decoder connected to the respective stages of said shift register for detecting when the contents of the stages of said shift register are representative of one of the numbers $2^k - 1$ and $2^k - 2$ and providing respective signals indicative thereof and further including a receiver transcoder for converting the contents of said shift register from reflected binary code into natural binary code.

11. A system including a coder portion and a decoder portion according to claim 10, said decoder portion further including a memory and a receiver transfer means connected to said transcoder for storing the outputs thereof, a receiver counter coupled to said receiver clock for counting the clock signals generated thereby and a comparing means for comparing the contents of said counter with the contents of said memory and generating an output signal upon coincidence thereof.

12. A system including a coder portion and a decoder portion according to claim 11, wherein said comparing means includes $k$ comparators, each having two inputs one of which is connected to a respective stage of said memory and the other to a corresponding stage of said receiver counter, and a AND gate having $k$ inputs connected to the outputs of said comparators and an output flip-flop connected to the output of said AND circuit.

13. A system including a coder portion and a decoder portion according to claim 12, wherein an output of one stage of said receiver decoder is connected to said flip-flop, whereby said flip-flop will be reset to a 1 condition upon the decoding of the number $2^k-1$, and another output of another stage of said receiver decoder is coupled to said flip-flop, whereby said flip-flop will be reset to a 0 condition upon the decoding of the number $2^k-2$.

14. A system including a coder portion and a decoder portion according to claim 13, said decoder portion further including a synchronizing means having a counter with $k$ stages, which receives pulses at a frequency H', which is reset to zero by said receiver decoder and is coupled to a zero position decoder for providing a transfer signal to said receiver transfer means and a signal for resetting said receiver counter.

15. A system including a coder portion and a decoder portion according to claim 14, said decoder portion further including means, responsive to the coincidence of a zero decoding produced by said zero position decoder and a decoding of a sample condition by said receiver decoder for resetting said flip-flop to zero.

16. A system including a coder portion and a decoder portion according to claim 15 said decoder portion further including a monostable flip-flop, inserted at the output of said zero position decoder, for delivering said transfer signal and the signal for resetting said receiver counter to 1, for at least the length of time required for the remaining signals to be propagated within the decoding means.

* * * * *

UNITED STATES PATENT OFFICE
CERTIFICATE OF CORRECTION

Patent No. 3,754,238 Dated August 21, 1973

Inventor(s) Jacques Oswald

It is certified that error appears in the above-identified patent and that said Letters Patent are hereby corrected as shown below:

Title Page, insert the Following:

[73] Assignee: CIT-COMPAGNIE INDUSTRIELLE DES TELECOMMUNICATIONS, PARIS, FRANCE

Signed and sealed this 16th day of April 1974.

(SEAL)
Attest:

EDWARD M. FLETCHER, JR.
Attesting Officer

C. MARSHALL DANN
Commissioner of Patents